United States Patent
Chapman

[19]

[11] Patent Number: 6,161,894
[45] Date of Patent: Dec. 19, 2000

[54] FLEXIBLE ELECTRIC CABLE FOR SLIDING VEHICLE DOOR

[75] Inventor: David Joseph Chapman, Sterling Heights, Mich.

[73] Assignee: Delphi Technologies, Inc., Troy, Mich.

[21] Appl. No.: 09/322,390

[22] Filed: May 28, 1999

[51] Int. Cl.[7] ........................................ B60J 5/06
[52] U.S. Cl. .......................................... 296/155; 439/162
[58] Field of Search ................................ 296/155; 49/27, 49/28; 174/69; 307/10.1, 147; 439/32, 34, 162, 174

[56] References Cited

U.S. PATENT DOCUMENTS

| | | | |
|---|---|---|---|
| 5,194,011 | 3/1993 | Yeakley et al. | 439/162 |
| 5,536,061 | 7/1996 | Moore et al. | 296/155 |
| 5,581,944 | 12/1996 | Kornbrekke et al. | 49/28 |
| 6,036,259 | 3/2000 | Hertel et al. | 296/216.01 |

*Primary Examiner*—Joseph D. Pape
*Assistant Examiner*—Mickki D. Murray
*Attorney, Agent, or Firm*—Patrick M. Griffin

[57] ABSTRACT

A vehicle has a body with a track beneath a side opening and a sliding side door for closing the side opening that has a roller assembly that engages the track. A flexible electric cable that connects electrical components on the sliding side door to a power source in the body includes a flat cable and a flexible stiffener attached to the flat cable inside an outer sheath. A clamp attaches an inner portion of the flexible electric cable to the track in cantilever fashion, and a second clamp attaches an outer portion of the flexible electric cable to the roller assembly of the sliding side door in cantilever fashion. The flexible electric cable has a vertical loop portion attaching a free end of the inner portion to a free end of the outer portion. The first clamp includes an attachment strip that is attached to the flat cable and the flexible stiffener inside the sheath and that has a portion projecting out of the sheath through a slot in the sheath for attachment to the track. The flexible stiffener has a slightly curved cross section that has a convex side that engages the flat cable. The second clamp has a rib for maintaining the slightly curved cross section of the flexible stiffener. The flexible stiffener is made of a thin strip of spring tempered steel.

10 Claims, 3 Drawing Sheets

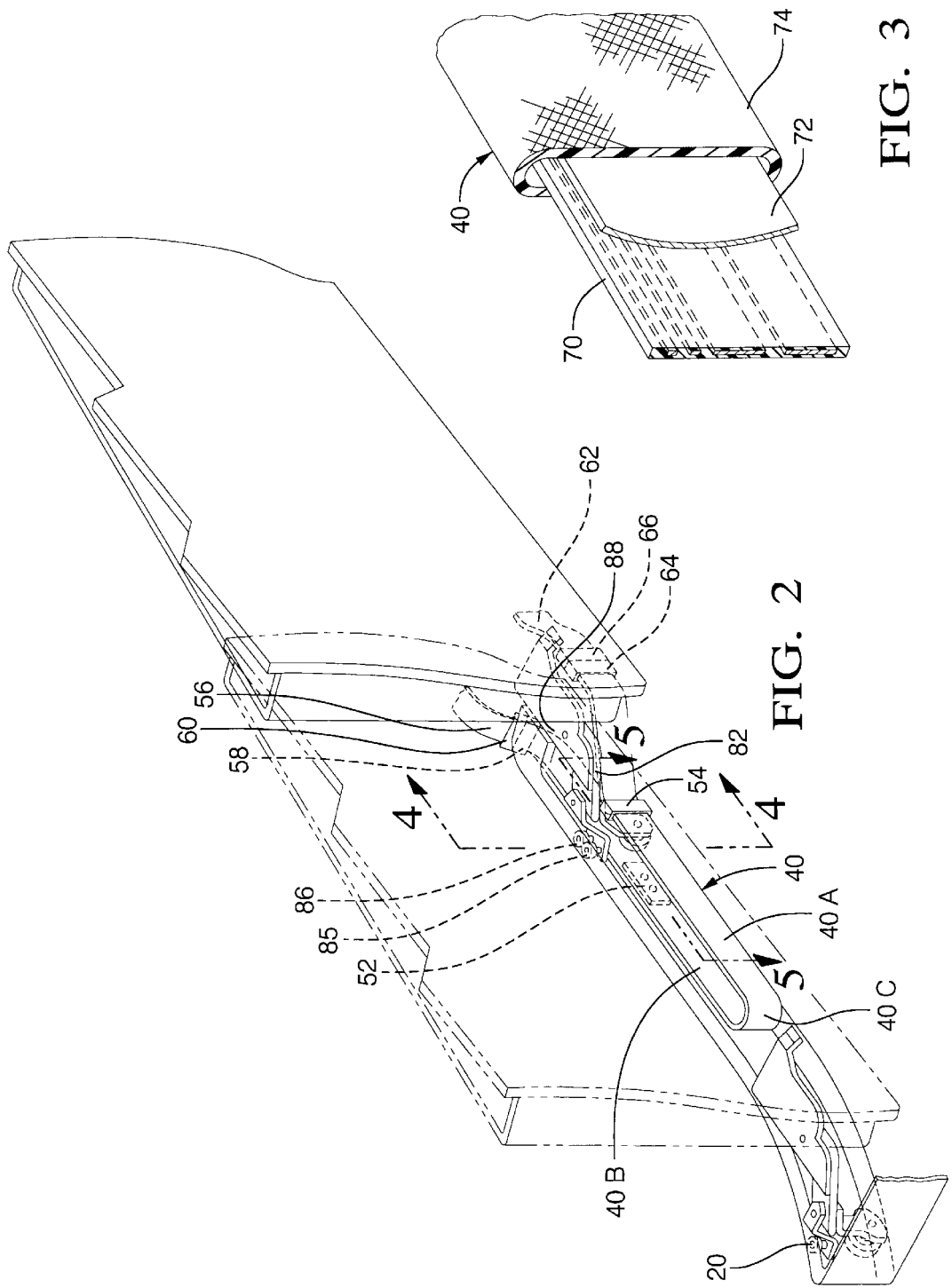

FLEXIBLE ELECTRIC CABLE FOR SLIDING VEHICLE DOOR

TECHNICAL FIELD

This invention relates to a sliding vehicle door, such as is commonly used on a passenger van, and more particularly to a flexible electric cable for such a sliding vehicle door.

BACKGROUND OF THE INVENTION

U.S. Pat. No. 5,316,365 granted to Howard W. Kuhlman and Jeffrey K. Joyner May 31, 1994 discloses a sliding vehicle door for a passenger van. The sliding door is supported and guided by an upper track, a center track and a lower track. An upper roller assembly is attached to an upper forward corner of the door and runs in the upper track which is at the top of the side door opening. A lower roller assembly is attached to the lower forward corner of the door and runs in the lower track which is at the bottom of the side door opening. A hinge and roller assembly is pivotally attached to the middle rear portion of the door and runs in the center track which is in the rear side panel of the van.

In the past, sliding doors for vans have been equipped with electrical connectors at the leading door edge that contact a cooperating electrical connector in the door jamb when the sliding door is closed. This arrangement provides electrical power to electrical components that are mounted on the sliding door when the sliding door is closed. However, the electrical components do not have any electrical power source when the sliding door is even partially opened.

Consequently, the function and types of electrical components that can be mounted on the sliding door is very limited.

SUMMARY OF THE INVENTION

The object of this invention is to provide a flexible electric cable for connecting electrical components mounted on a sliding vehicle door to a power source in the vehicle so that the electrical components are electrically connected to the power source irrespective of the position of the sliding vehicle door.

A feature of the invention is that the flexible electric cable has a straight section that is attached to the vehicle body in cantilever fashion followed by a loop followed by another straight section that is attached to the sliding vehicle door in cantilever fashion.

Another feature of the invention is that the flexible electric cable has a flat cable and a stiffener that is associated with the flat cable so that the flexible electric cable does not sag.

Yet another feature of the invention is that the flexible electric cable has a flat cable and a resilient stiffener that is associated with the flat cable to maintain the straight sections substantially parallel to the ground and to each other while accommodating a transverse loop attaching free ends of the straight sections to each other.

Still another feature of the invention is that the flexible electric cable has a resilient stiffener that loops and reverses direction easily and without sagging.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein:

FIG. 2 is a partial perspective view of the passenger van of FIG. 1 showing the sliding side door in various positions;

FIG. 3 is a perspective, partially sectioned length of the flexible electric cable that is shown in FIG. 1;

DETAILED DESCRIPTION OF THE PREFERRED EMBODIMENT

Figure 1:
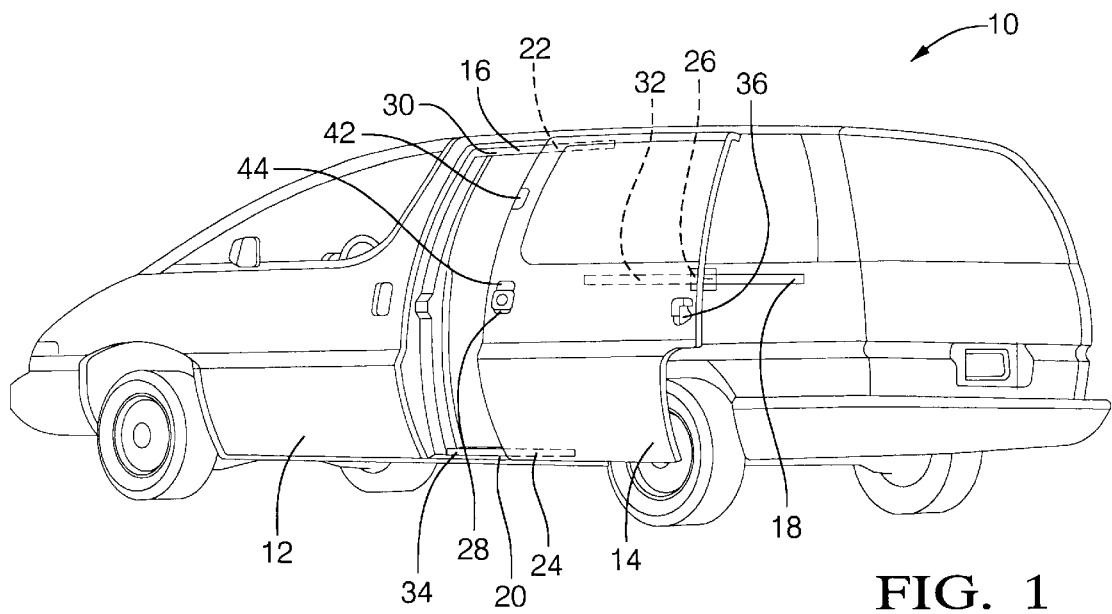
FIG. 1 is a schematic perspective view of a passenger van having a sliding side door that is shown partially open.

Vehicles such as passenger van 10 shown in FIG. 1 have a hinged front passenger door 12 and a rear side door 14. The rear side door 14 is commonly a sliding door mounted on rollers that run in tracks. The sliding door 14 historically is on the passenger side of the vehicle but in recent years vans with sliding doors on both sides of the vehicle have become popular. This is also true of cargo or utility vans. Cargo or utility vans have the same body structure as the passenger vans but have interiors that are outfitted to carry cargo or for some other purpose.

The sliding side door 14 is supported and guided by an upper track 16, a center track 18 and a lower track 20. An upper roller assembly 22 is attached to an upper forward corner of the door and runs in the upper track 16 which is at the top of the side door opening. A lower roller assembly 24 is attached to the lower forward corner of the door and runs in the lower track 20 which is at the bottom of the side door opening. A hinge and roller assembly 26 is pivotally attached to the middle rear portion of the door and runs in the center track 18 that is in the rear side panel of the van.

The operation of a sliding door for a van type vehicle is well known and understood and need not be described in detail. Suffice it to say, that the sliding door 14 moves horizontally from an open position shown in solid line in FIG. 2 toward the front of the van and horizontally inwardly to a closed position for closing and sealing the side opening. Latch 28 (FIG. 1) is provided at the front of the sliding door 14 to latch the door 14 in the closed position. Inward horizontal movement of sliding door 14 is achieved by curving the forward ends 30, 32 and 34 of tracks 16, 18 and 20 inward. Latch 36 is provided at the aft end of the sliding door 14 to latch the sliding door 14 in the open position which is shown in solid line in FIG. 2.

This invention is directed to providing a flexible electric cable 40 for connecting electrical components that are mounted on sliding door 14, such as an obstacle detection switch 42 mounted on the front edge of the sliding door 14 or a detent switch 44 mounted on latch 28 which allows an operator to power close the door by manipulating the door handle, to an electrical power source in the vehicle.

Flexible electric cable 40 is attached to lower track 20 of the vehicle body by a clamp assembly 52. Clamp assembly 52 is shown schematically in FIG. 2 and in detail in FIGS. 4 and 5. The flexible electric cable 40 then proceeds forward in a linear, cantilever fashion, loops back around and then proceeds rearward to the lower roller assembly 24 where the flexible electric cable 40 is attached to door 14 in linear, cantilever fashion by a clamp assembly 54. Clamp assembly 54 is shown schematically in FIG. 2 and in detail in FIGS. 6 and 7.

The flexible electric cable 40 proceeds rearward from clamp assembly 52 and then through aligned holes in the track 20 and the vehicle body. Once inside the vehicle body, the flexible electric cable 40 is attached to a wiring harness 56 that includes at least one power lead by conventional mating electrical connectors 58 and 60. The flexible electric cable 40 also proceeds rearward from clamp assembly 54 and then through a hole in the lower inside panel of sliding door 14. Once inside the sliding door 14, the flexible cable 40 is attached to a wiring harness 62 for the electric components mounted on the side door 14 by conventional mating electrical connectors 64 and 66.

Referring now to FIG. 3, flexible electric cable 40 comprises a flat cable 70, a flexible stiffener 72 and an insulator sheath 74 of woven polyester. Flat cable 70 is well known in the art and need not be described in detail. One well known type of flat cable is a laminate consisting of flexible copper strips sandwiched between two sheets of Mylar. Mylar is the trademark for polyester film marketed by DuPont. Flexible stiffener 72 is preferably a thin, flexible, spring tempered steel strip. The strip is preferably slightly curved in transverse cross section to increase stiffness in the longitudinal direction while retaining a high degree of bending flexibility in the lateral direction. This material is commonly used in retractable metal tape measures that are wound on a reel. Flexible stiffener 72 is attached to the flat cable 70 in a fixed manner for example by an adhesive or by wrapping electrician's tape around the flat cable 70 and the stiffener 72 at a plurality of spaced locations. Flexible stiffener 72 is preferably located inside the looped flat cable 70 with the convex side engaging flat cable 70 and the concave side of the stiffener facing inwardly of the loop. This provides a smooth rolling action of the flexible electric cable 40 as the side door 14 opens and closes as well as maintains a linear, non sagging shape for the cantilevered portion of flexible electric cable 40. Thus cable 40 can be located in the lower track 20 without interfering with the opening and closing action of the side door 14 or dropping below the vehicle body. The insulator sheath 74 is a woven polyester material in the form of a flat pliable tube that surrounds the flat cable 70 and the stiffener 72 to provide an outer protective covering.

Figure 4:
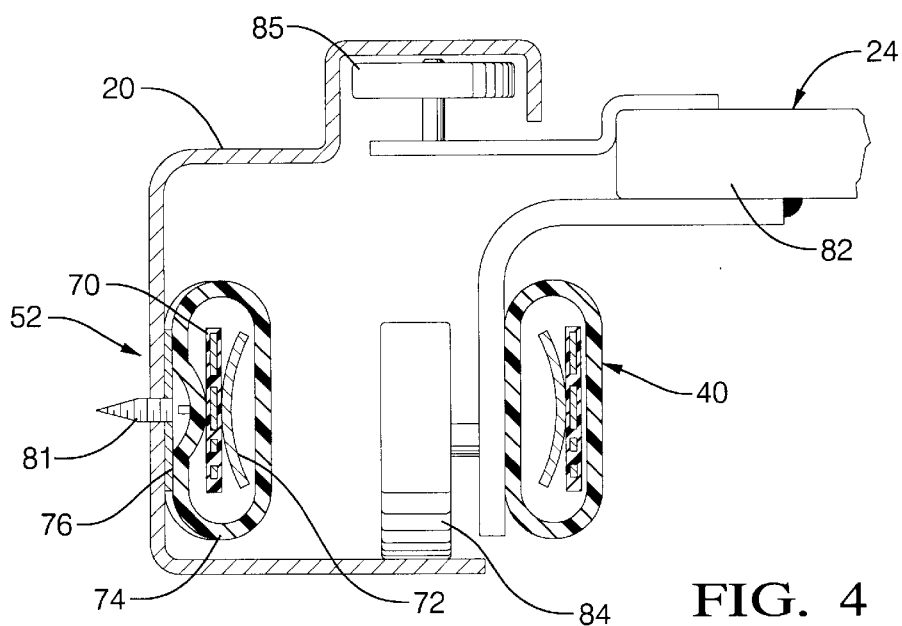
FIGS. 4 and 5 are sectional views taken substantially along the line 4—4 and 5—5 of FIG. 2 showing the attachment of the flexible electric cable to the lower track for the sliding side door.
Figure 5:
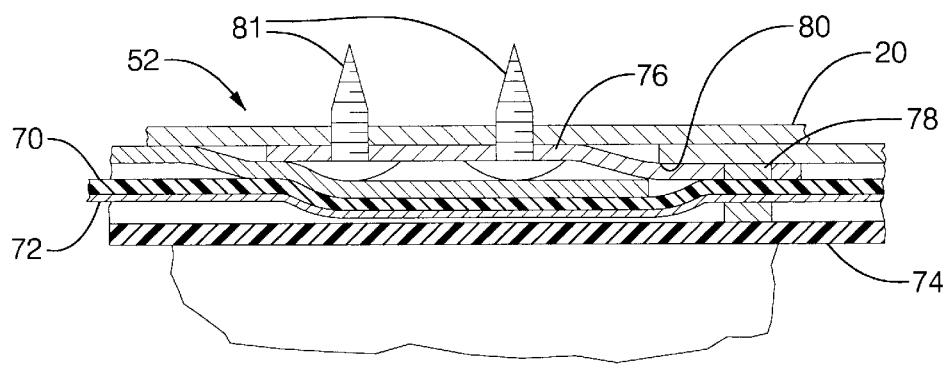

Referring now to FIGS. 4 and 5, clamp assembly 52 comprises an attachment strip 76 that is preferably made of stainless steel. Attachment strip 76 is suitably secured to flat cable 70 and flexible stiffener 72 inside sheath 74, for example by a tight wrapping 78 of electrician's tape. Attachment strip 76 then projects through a slot 80 in sheath 74. The projecting portion of attachment strip 76 is then secured to the vertical wall of track 20 by screws 81 or other suitable fasteners.

The articulating lower roller assembly 24 comprises a carriage 82 that carries a support roller 84 for rotation about a horizontal axis and two guide rollers 85 and 86 for rotation about two spaced vertical axes. Support roller 84 supports the majority of the weight of sliding door 14 while guide rollers 85 and 86 engage track 20 to guide sliding door 14 as it moves back and forth between an open position and a closed position as described below. Roller assembly 24 further includes a support arm 88 that is pivotally connected to carriage 82 at an inboard end and secured to sliding door 14 at an outboard end.

Figure 6:
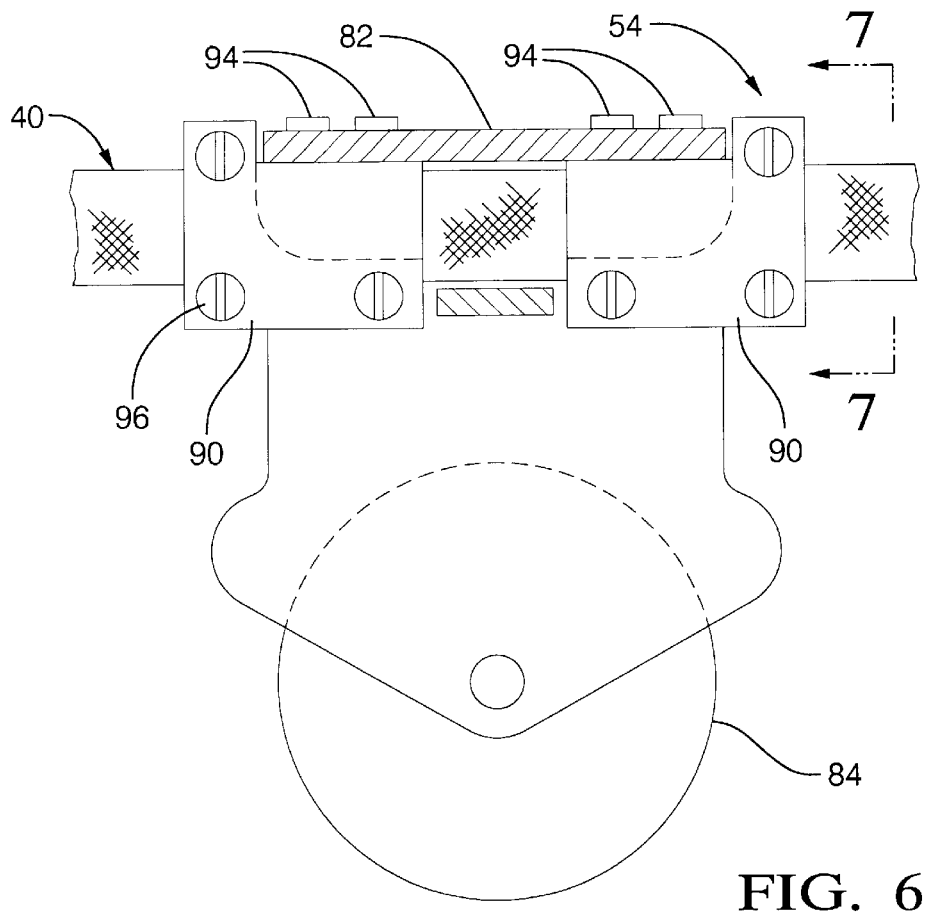
FIGS 6 and 7 are sectional views taken substantially along the line 6—6 and 7—7 of FIG. 2 showing the attachment of the flexible electric cable to the lower roller bracket that is attached to the sliding side door.
Figure 7:
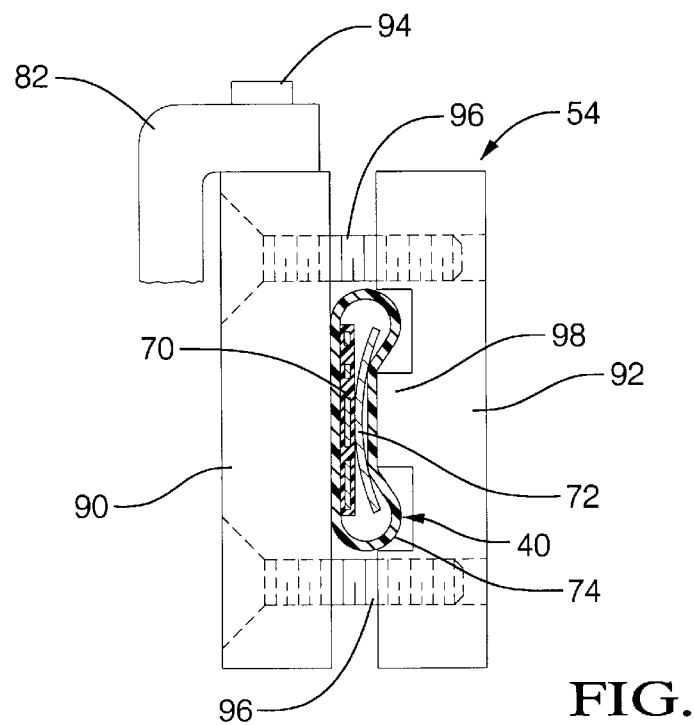

Referring now to FIGS. 6 and 7, clamp assembly 54 comprises two spaced outside clamp pieces 90 and two inside clamp pieces 92 that cooperate with the respective outside clamp pieces 90. The clamp pieces may be aluminum to reduce weight. Outside clamp pieces 90 are secured to carriage 82 by two machine screws 94 or other suitable fasteners. Each outside clamp piece 90 is secured to an inside clamp piece 92 by three machine screws 96 with flexible electric cable 40 clamped between the pieces 90 and 92 as best shown in FIG. 7. Each inside clamp piece 92 is preferably shaped with two longitudinal grooves separated by a longitudinal rib 98 that engages stiffener 72 through sheath 74 to help maintain the inward facing concave shape of stiffener 72.

Flexible electric cable 40 operates as follows. Assuming side door 14 is latched in the closed position as shown in dashed line in FIG. 2, door 14 is opened by releasing latch 28 either by a conventional inside or outside latch operating handle (not shown) and then sliding side door 14 rearward to the open position shown in solid line in FIG. 2. As side door 14 slides rearward, roller assembly 24 carries the attached end of outer linear, cantilever cable portion 40a rearward. This causes, the free end section of inner linear, cantilever cable portion 40b to pass through the vertically oriented reverse bend or loop 40c so that the length of outer portion 40a increases while the length of inner portion 40b decreases. Outer portion 40a is at its greatest length and inner portion 40b is at its shortest length when sliding door 14 is fully open as shown in solid line in FIG. 2. When sliding door 14 is closed, roller assembly 24 carries the attached end of outer cable portion 40a forward and the process is reversed. That is the length of the inner portion 40b increases while the length of the outer portion 40a decreases until sliding door 14 is closed. In either event, the straight cantilever shape of the inner and outer portions 40a and 40b is maintained by the flexible stiffener 72 while the free end sections of these portions roll into and out of the loop or reverse bend 40c. In this regard, it should be noted that the slight curvature of the flexible stiffener enhances the longitudinal stiffness of the straight inner and outer portions 40a and 40b while maintaining the bending flexibility of the flexible stiffener in the lateral direction particularly when the concave side of the curvature faces inwardly. This permits the location and association of the flexible electric cable 40 with lower track 20 where the flexible electric cable 40 is safely above the ground and below the vehicle floor out of the way of passengers.

Obviously, many modifications and variations of the present invention in light of the above teachings may be made. It is, therefore, to be understood that, within the scope of the appended claims, the invention may be practiced otherwise than as specifically described

I claim:

1. A flexible electric cable for a sliding side door of a vehicle, the flexible electric cable comprising:

a flat cable, and a flexible stiffener that is attached to the flat cable, a clamp for attaching a portion of the flexible electric cable to a vehicle body in cantilever fashion, and a second clamp for attaching a second portion of the flexible electric cable to a sliding side door of the vehicle body in cantilever fashion, the flexible electric cable having a vertical loop portion attaching a free end of the first portion to a free end of the second portion.

2. The flexible electric cable of claim 1 further comprising a sheath surrounding the flat cable and the flexible stiffener.

3. The flexible electric cable of claim 1 wherein the flexible stiffener is a spring tempered steel.

4. The flexible electric cable of claim 3 wherein the flexible stiffener has a slightly curved cross section.

5. The flexible electric cable of claim 4 wherein the flexible stiffener has a convex side that engages the flat cable and a concave side that faces inwardly of the loop.

6. In a vehicle having a body having a track beneath a side opening and a sliding side door for closing the side opening having a roller assembly that engages the track, a flexible electric cable for connecting electrical components on the sliding side door to a power source in the body, the flexible electric cable comprising:

a flat cable, and a flexible stiffener that is attached to the flat cable, a clamp for attaching an inner portion of the flexible electric cable to the track in cantilever fashion, and a second clamp for attaching an outer portion of the flexible electric cable to the roller assembly of the sliding side door in cantilever fashion, the flexible electric cable having a vertical loop portion attaching a free end of the first portion to a free end of the second portion.

7. The flexible electric cable of claim 6 wherein the flexible electric cable has an outer sheath and wherein the first clamp includes an attachment strip that is attached to the flat cable and the flexible stiffener inside the sheath, the attachment strip having a portion projecting out of the sheath through a slot in the sheath for attachment to the track.

8. The flexible electric connector as defined in claim 6 wherein the flexible stiffener has a slightly curved cross section that has a convex side that engages the flat cable and wherein the second clamp has a rib for maintaining the slightly curved cross section of the flexible stiffener.

9. The flexible electric connector as defined in claim 7 wherein the flexible stiffener has a slightly curved cross section that has a convex side that engages the flat cable and wherein the second clamp has a rib for maintaining the slightly curved cross section of the flexible stiffener.

10. The flexible electric connector as defined in claim 9 wherein the flexible stiffener is made of a thin strip of spring tempered steel.

* * * * *